G. E. HAZARD.
AUTOMOBILE DRIVEN TIRE PUMP.
APPLICATION FILED SEPT. 12, 1919.
1,334,858.
Patented Mar. 23, 1920.
2 SHEETS—SHEET 1.
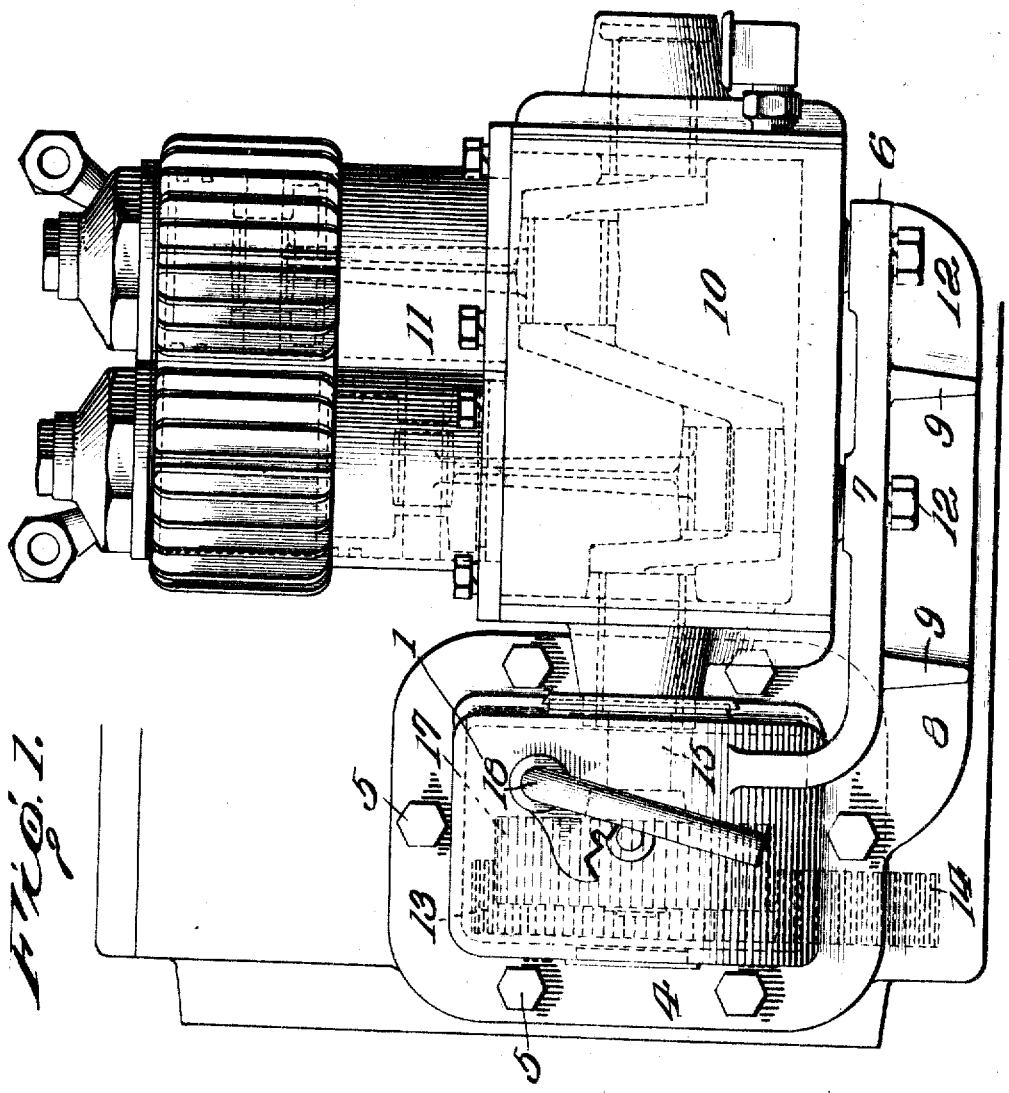
Inventor
George E. Hazard,
By A. S. Pattison
Attorney

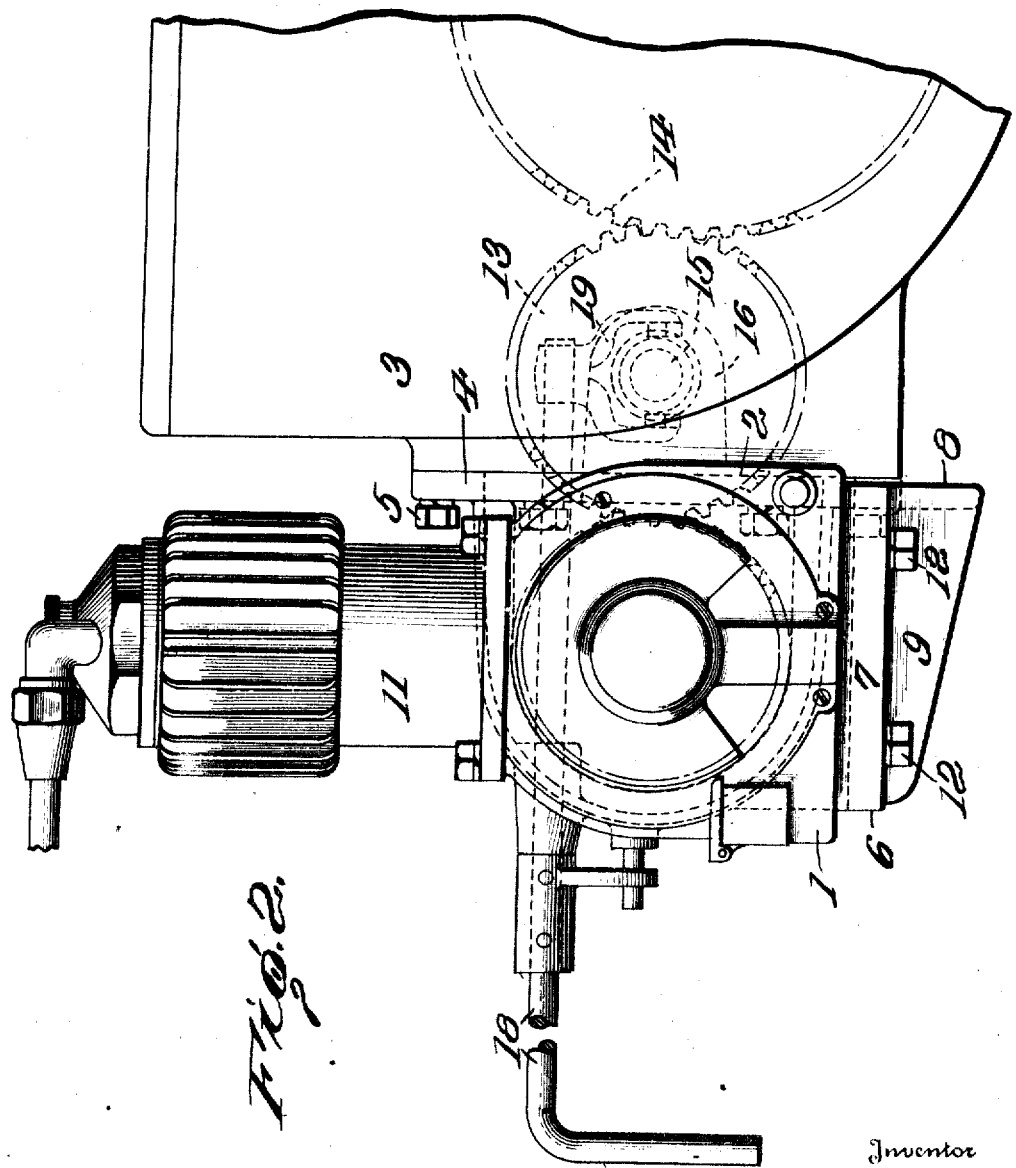

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

AUTOMOBILE-DRIVEN TIRE-PUMP.

1,334,858.  Specification of Letters Patent.  Patented Mar. 23, 1920.

Application filed September 12, 1919. Serial No. 323,391.

*To all whom it may concern:*

Be it known that I, GEORGE EDGAR HAZARD, a citizen of the United States, residing at Rochester, in the county of Monroe and State of New York, have invented certain new and useful Improvements in Automobile-Driven Tire-Pumps, of which the following is a specification, reference being had therein to the accompanying drawing.

This invention relates to improvements in automobile driven tire pumps, and it pertains to that class of tire pumps which are constructed to be attached to the transmission case of an automobile.

My improved pump involves a crank or eccentric case upon which is mounted a pump cylinder, or cylinders, and a separate gear case carrying gears operatively connected with the pump driving shaft, the gear case having an open side registering with an opening in the automobile transmission case, whereby the gears of the pump gear case are adapted to be driven by the gear in the automobile transmission case, the structure adapted to be attached in position to the said transmission case.

One object of my present invention is to have the gear case and the crank, or eccentric case, separate, but so constructed that when it is attached to the gear case, it will support the other, with the gears of the gear case and the drive shaft of the pump case in proper operative relation with each other.

Another object of my present invention is to construct the pump gear case so that it will carry a bearing for an idler gear between the gear of the transmission case and the gear of the pump gear case.

One of the problems of automobile driven tire pumps is to provide lubrication for the parts and at the same time prevent an excessive lubrication reaching the pump cylinder, or cylinders, and working its way to the air compression chamber of the pump, and in that way being forced into the tire and rotting or deteriorating the rubber of the tire.

In the type of pump to which this invention relates, the pump gear case is in open communication with the automobile transmission case and receives a large amount of lubricant from the transmission case, and it is necessary to prevent excessive lubrication in the pump gear case reaching the pump crank or eccentric case or housing, and as a consequence, finally reaching the air compression chamber of the pump with the destructive effect above mentioned.

My present improvement consists in making the pump gear case and the pump housing separate from each other and having one support the other in proper operative relation, so that the excessive lubrication in the gear case will not reach the pump housing, and lubrication to the operating parts in the pump housing and the cylinder is effected by a separate means constructed to be controlled to effect efficient lubrication, while at the same time prevent excessive lubrication of the pump parts, for the reason above mentioned.

In the accompanying drawings—

Figure 1 is an outside elevation of a pump housing and gear case showing a part of the automobile transmission, with the gearing shown in dotted lines.

Fig. 2 is an end elevation of my improved construction attached to the automobile transmission case, the gearing being shown in dotted lines.

In carrying out my present improvement, I provide a pump gear case 1, which is provided with an open inner side 2, that registers with an opening in the outer side of the transmission case 3 of the automobile. The opening 2 of the gear case is provided with a surrounding flange 4, through which clamping bolts 5 pass and into the transmission case 3, by means of which the pump gear case is firmly bolted to the automobile transmission case.

This gear case 1 is provided with a laterally extending bracket 6, which comprises a horizontal shelf 7, a longitudinal vertical rib 8 extending downward from the inner edge of the shelf 7, and vertical ribs 9, arranged transverse the shelf 7 and extending to the longitudinal rib 8. The shelf 7 and the ribs 8 and 9 are made integral.

A separate pump, crank or eccentric housing 10 is provided and the pump cylinder, or cylinders 11, are mounted thereon.

This pump housing is supported upon and attached to the bracket or shelf 7, by suitable bolts 12, and the bracket and housing are so proportioned and arranged that the gear shaft 13 is in proper operative relation, or concentric with the pump operating mechanism within the housing 10. By this improved construction it will be observed that the housing 10 and gear case 1, are separate from each other, whereby the lubricant from the gear case will not reach the pump housing and whereby the pump housing and the gear case are separately constructed with the attendant advantages in manufacture and operation of the parts when assembled. The bracket forms a solid support for the pump housing, whereby when in their mounted positions they act as a unit and both are firmly supported in their operative positions, although they are capable of separation as described.

Another part of my present improvement is to have the pump gearing case carry an idler gear 13 in position to mesh with an automobile transmission gear 14. In the specific construction here shown, the idler gear shaft or bearing 15 is mounted in inwardly extending supporting arms 16, which extend inward from the gear case, and this idler gear 13 is movable on its shaft 15 to be thrown in and out of mesh with the transmission gear 14, while remaining at all times in mesh with a wide gear 17 of the gear case 1. A suitable shifting shaft 18 extends from the outside of the gear case and carries at its inner end a suitable shifting yoke 19, for moving the idler gear 13 in and out of mesh with the transmission gear 14.

The primary object of this last mentioned construction is to have the pump gear case support an idler gear, but I do not limit myself to the specific construction here shown. That is to say, this construction may be varied by lengthening the pump gear case inward instead of having the arms 16, and in this case the idler gear shaft will be mounted in the gear extension. This arrangement, of course, will carry the idler gear shaft outside of the automobile transmission case, but it will adapt the construction for certain forms of automobile transmission which do not require the pump gear mechanism to extend into the transmission case, as far as that here shown. However, in either construction the idler gear shaft is supported by the pump gear case.

Any suitable means may be connected with the shaft 18 for holding it in its two shifted positions without affecting my present improvement.

I do not limit myself to the exact construction here shown, for accomplishing the mounting of separate pump gear cases and pump housings in registered relation with each other and with the transmission case, whereby the advantages hereinbefore pointed out are accomplished, because the construction here shown may be varied without departing from my invention, so long as the objects thereof are accomplished.

For the purpose of convenience and brevity in the claims, the crank or eccentric case 10, will be referred to as a pump housing to distinguish it from the pump gear case 1.

Having thus described my invention, what I claim and desire to secure by Letters Patent is:—

1. An automobile driven tire pump construction, comprising a gear case having an open side adapted to be bolted to and in communication with an opening in an automobile transmission case, a separate pump housing, one of the last mentioned members carrying a supporting bracket to which the other member is bolted and the bracket and member supported thereby constructed to support the driving mechanisms of the pump housing and the gear case in operative relation.

2. An automobile driven tire pump construction comprising a gear case having an open side adapted to be firmly attached to an automobile transmission case and in communication with an opening in the last said case, the gear case having a pump supporting bracket extending in a direction longitudinal to the automobile transmission case, and a separate pump housing constructed to be mounted and firmly attached to the said bracket with its operating mechanism in operative relation with the gear case mechanism.

3. An automobile driven tire pump construction, comprising a gear case having an open side adapted to be firmly attached to an automobile transmission case and in communication therewith, the gear case having a horizontally and longitudinally projecting pump supporting bracket, and a separate pump housing constructed to rest upon and be firmly attached to the bracket with the operating mechanisms of the pump housing and gear case in operative relation.

4. An automobile driven tire pump construction, comprising a gear case having an open side adapted to be attached to and in communication with an automobile transmission case, the gear case having a horizontally and longitudinally projecting integral bracket with a wide horizontal portion adapted to receive a pump housing, and a separate pump housing constructed to rest upon and be firmly attached to the horizontal bracket with operating mechanisms of the housing and gear case in operating relation.

5. An automobile driven tire pump construction, comprising a gear case attached to and located outside of an automobile transmission case, the gear case having an open side adapted to communicate with the transmission case, the gear case having a gear shaft carrying a gear located within the gear case, the open side of the gear case having an inwardly projecting idler gear support, an idler gear supported by said support, one of said gears laterally movable on its shaft for the purpose described, a transmission gear in the transmission case, the idler gear adapted to mesh with the transmission gear.

In testimony whereof I hereunto affix my signature.

GEORGE EDGAR HAZARD.